United States Patent [19]
Castro et al.

[11] 3,808,672
[45] May 7, 1974

[54] METHOD OF MATERIAL HOLDING AND SMOKE REMOVAL FOR A LASER CUTTER

[76] Inventors: Rodolfo Castro, 8092 Madia Cir., La Palma, Calif. 90260; Esteban J. Toscano, 1202 No. Pacific Apt. 33A, Oceanside, Calif. 92054

[22] Filed: July 10, 1973

[21] Appl. No.: 378,118

Related U.S. Application Data

[62] Division of Ser. No. 184,139, Sept. 27, 1971.

[52] U.S. Cl............................ 29/559, 219/121 LM
[51] Int. Cl.............................................. B23q 7/00
[58] Field of Search...... 29/559; 248/263, 262, 261; 271/74; 302/29; 34/115, 151; 269/21, 20; 219/121 L, 121 LM

[56] References Cited
UNITED STATES PATENTS

| | | | |
|---|---|---|---|
| 3,096,162 | 7/1963 | Jepson | 34/33 |
| 3,294,392 | 12/1966 | Dunham | 29/559 |
| 3,681,853 | 8/1972 | Reid | 34/151 |
| 3,741,116 | 6/1973 | Green et al. | 269/21 X |

*Primary Examiner*—Charles W. Lanham
*Assistant Examiner*—Victor A. DiPalma
*Attorney, Agent, or Firm*—William H. MacAllister, Jr.; Joseph E. Szabo

[57] ABSTRACT

To remove combustion by-products and to secure fabric being cut, the cutting area of a laser fabric cutter is enclosed in a hood through which air flows in a stream, first over and then under the enclosed air-permeable cutting surface on which the cloth is supported.

3 Claims, 4 Drawing Figures

METHOD OF MATERIAL HOLDING AND SMOKE REMOVAL FOR A LASER CUTTER

This is a division of application Ser. No. 184,139, filed Sept. 27, 1971.

There has recently been developed at Hughes Aircraft Company, assignee of the present invention, a fabric cutter in which cloth from a bolt is cut into patterns by means of a traveling laser beam. Basically, cloth to be cut is spread in a single layer onto a cutting surface which is movable into and out of a cutting area within which a laser beam is made to travel through a selected route over the cloth. The laser beam is focused at the level of the cloth and cuts through it cleanly by burning a narrow path therethrough. The cutting surface is preferably an air-permeable, open celled, thin walled, honeycomb material in order to expose a minimum of the support surface to the laser beam.

The patterns into which the cloth has been cut are then removed, subsequently to be assembled into garments, such as men's suits. Since the patterns must interfit when assembled into garments, they must be accurately cut. The path of the laser beam is controlled by a computer and can be made very accurate. To take advantage of this inherent accuracy, however, it is necessary that the layer of the material being cut be held flat and motionless upon the cutting surface. Another requirement is a laser cloth cutting system is to remove the undesirable by-products of the cutting operation, namely smoke and burned cloth particles, lest they form a coating on the optical system used to produce the laser beam.

A principal object of the present invention is to provide a technique for securely holding a layer of material, typically cloth, on top of an air-permeable cutting surface. Another object of the invention is to devise a means for quickly removing the combustion products generated by a traveling, focused laser beam cutting through a layer of material, without disturbing that material.

In accordance with the present invention a layer of material such as cloth is held securely upon an air-permeable support surface by directing air initially to flow over the material and across the support surface and then directing the same air to flow under the support surface, thereby creating a net air pressure differential tending to press the cloth against the support surface. Moreover, the same airflow which is used to create the air pressure differential also serves to remove, continuously and immediately, the cloth particles and smoke created by the traveling laser beam and expelled from the cutting point both upward and downward through the support member.

There is further provided in accordance with the present invention an air circulating system for implementing the above technique. It includes an enclosure within which the support surface is housed. The enclosure defines an enclosed airpath which includes an initial region above the support surface and a terminal region below the support surface, as well as means for forcing a stream of air to flow along the enclosed airpath, through the initial and terminal regions successively, thereby creating the desired net air pressure to hold the cloth against the support surface. In further keeping with the invention the initial and terminal regions of the airpath are interconnected by an intermediate region which extends between them along one edge of the support surface.

Air is preferably forced to enter the enclosed airpath through an inlet which is located along an edge of the support surface opposite the edge next to which the intermediate region is located. The air is then forced to flow from the inlet, over the support surface, to the intermediate region, down past the edge of the support surface, and then under the support surface. This is best effected by an air exhaust means, such as a fan, connected through a duct to an exhaust port located in the enclosure under the level of the support surface, thereby drawing air in through the inlet and over the paths above and below the support surface as just described. Air guiding baffles may be provided under the support surface to insure that the air flows under substantially the entire support surface in the cutting area before it leaves through the exhaust port of the enclosure.

Further features and advantages of the invention will become apparent from the following detailed description with reference to the accompanying figures in which.

Figures 1, 2, 3, 4:
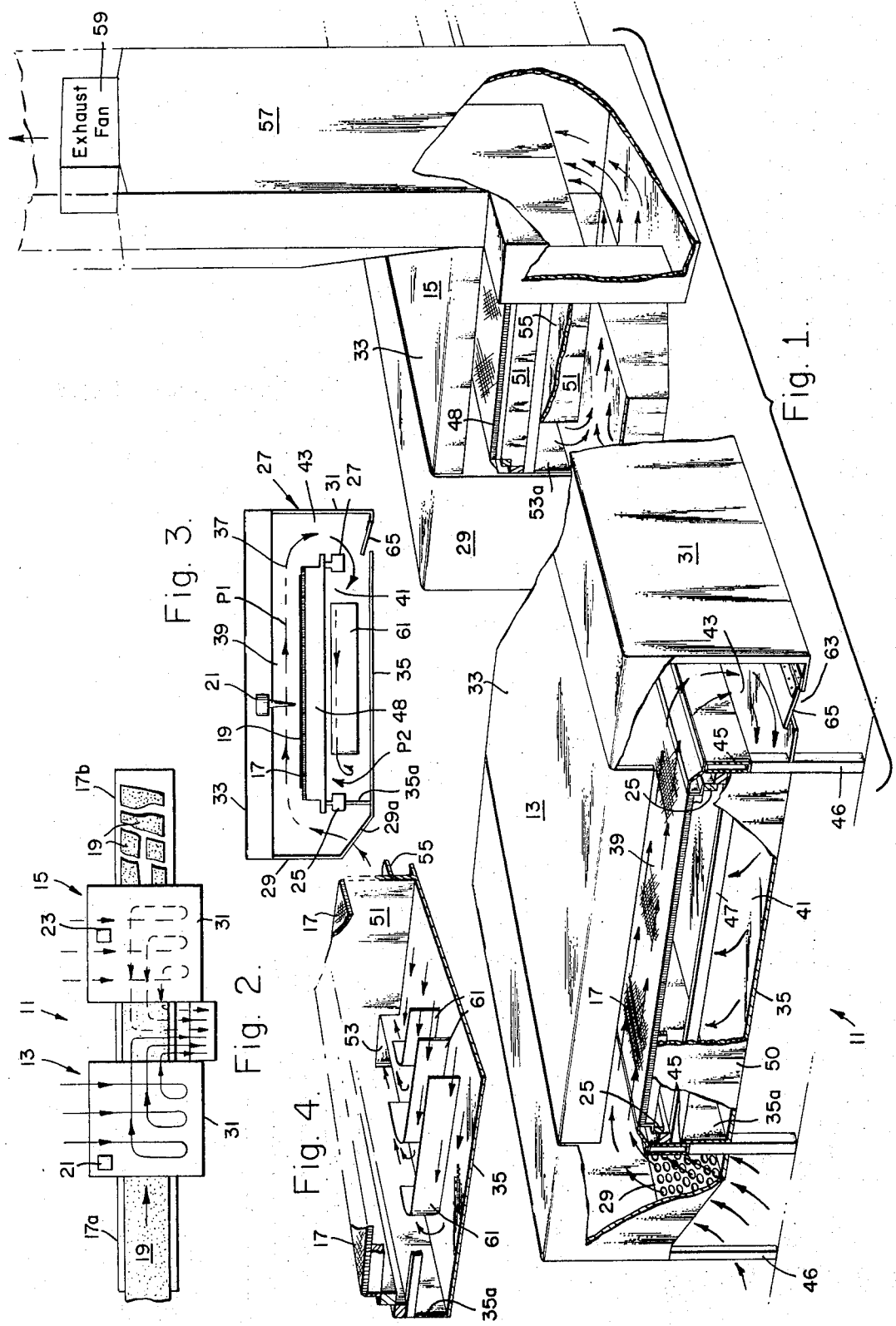
FIG. 1 is a perspective view, partially broken away, of an airflow control system for attaining the objects of the present invention.
FIG. 2 is a schematic plan view of FIG. 1, illustrating the path followed by the air forced through the system.
FIG. 3 is a schematic end view of the system of FIG. 1 further showing the path followed by the air forced through the system.
FIG. 4 is a perspective view, partially broken away, of a portion of the system of FIG. 1 and illustrating the baffles which may be provided under the support surface to define the path followed by the air under that surface.

Referring now to the figures, the invention will be described as part of a laser cloth cutting system 11 having two cutting stations 13 and 15. Although two cutting stations are shown, it will become apparent as this description proceeds that the present invention is equally applicable to a system having a different number of such stations. An elongate support surface 17 extends under both of the cutting stations 13 and 15 and holds the cloth 19 which is to be cut. The support surface 17 is preferably movable and may be either in the form of a conveyor belt or it may consist of one or more sliding trays. Whichever form it takes, the support surface 17 is air-permeable and for reasons not pertinent here, is preferably made of honeycomb panels having open cells defined by thin heat-conductive walls. As shown in FIGS. 1 and 3, these panels rest slidably on spaced apart guide rails 25 held by channel members 45 resting on legs 46 and braced by cross members 47. Spaced apart bracing members 48 extend under the support surface 17, across its width in order to give it more rigidity than that provided by the honeycomb panel structure itself.

The movable support surface 17 is shown in FIG. 2 as moving from left to right, first moving the cloth 19 under the first cutting station 13 and then under the second cutting station 15. The cloth 19 is shown as having been cut into individual patterns at 17b to the right of the second cutting station 15. Movable laser beam sources 21 and 23 are disposed in the respective cutting stations 13 and 15 above the support surface 17. The manner in which the laser beams are moved is not relevant to the present invention, it being sufficient to observe that they are independently guided in the two stations 13 and 15 by means of a computer or a numerical control and are free to move the laser beam substantially through the entire extent of the respective stations 13 and 15.

In operation the cloth 19 to be cut is moved in steps so that successive lengths of the cloth 19 are positioned in the cutting stations 13 and 15. During the cutting operation the support surface 17 is stationary and only the laser beams move. However, this is only for simplicity of operation and the invention could also be applied to a laser cutting system in which cutting is performed while the cloth is being moved.

In accordance with a principal feature of the present invention the cloth 19 is held securely on top of the support surface 17 by passing a stream of air above and below the support surface 17, with the pressure prevailing above the cutting surface being higher than that prevailing below it, thereby creating a net air pressure differential pressing the cloth 19 against the cutting surface by virtue of the fact that the latter is air permeable so that the relatively high pressure air space above the support surface communicates with the lower pressure air space below it. Advantageously the streams of air above and below the support surface 17 are created by maintaining a single air stream which flows first over and across the support surface 17 from its front edge toward its rear edge (see FIGS. 2 and 3) and which then returns under the same support surface generally in the opposite direction. The manner in which this is achieved in keeping with the invention is to maintain an air pressure differential between the beginning of the airstream and its end. As a result, the airstream will continue to flow in its desired pattern first above and then below the support surface and the air pressure prevailing therein will diminish gradually along its path from a maximum at the beginning of the stream to a minimum at its end. Significantly, the average air pressure, designated P1 in FIG. 3, prevailing above the support surface 17 and above the cloth 19 resting thereon is greater than that prevailing below the support surface, designated P2, thereby creating a continuous net air pressure P1–P2 acting to force the cloth 19 against the top of the support surface 17 so long as the airstream continues to flow.

The above described airpath is defined for each of the cutting stations 13 and 15 by a housing 27 which includes front and back, generally upright panels 29 and 31 and top and bottom generally horizontal panels 33 and 35. The top panel 33 also serves to enclose the means 21 and 23 by which the focused laser beams are caused to travel. Outer and inner end walls 50 and 51 complete the enclosures (FIGS. 1 and 4).

Air enters the housing 27 through a perforated intake section 29a of the front panel 29. Preferably the perforated section 29a extends substantially along the entire length of the front panel 29, and slants inwardly both for the sake of appearance and to prevent clothes worn by operators or observers from being drawn against the machine by air suction. The air which is drawn into the housing 27 through the intake portion 29a flows in a stream 37 which first passes through the initial portion 39 of the total airpath established within the housing. This initial portion 39 extends across the top of the support surface 17 from its front edge 18 to its back edge 20. In order to force the air which enters through the intake 29a to rise above the support surface, the bottom panel 29 has an upright extension 35a which prevents the incoming air from entering directly into the space beneath the surface 17. The air is next directed to flow through a terminal portion 41 of the airpath in the housing 27, this portion extending substantially from the rear edge 20 toward the front edge 28, under the support surface 17.

The airstream 37 reaches the terminal portion 41 of its path through an intermediate path portion 43 which extends around the rear edge 20 of the support surface and which is principally defined by the rear panel 31.

Referring to FIG. 2, the airstream in both of the cutting stations 13 and 15, illustrated by dashed lines, is seen to extend from the upper or front edges of the cutting stations, flowing across the support surface 17 toward the rear of the cutting stations, then folding back (under the support surface 17) and returning at least part way toward the front edges of the cutting stations and then turning sideways and exiting from the cutting stations along an edge which lies between their front and back edges. This is achieved most simply by providing for each housing 27 an exhaust (shown as the port 53 in FIG. 4, for the first cutting station 13, and as the port 53a in FIG. 1 for the second cutting station 15) in their inner end walls 51 under the support surface 17 near its front edge 18 so as to force the air to travel under the cutting surface substantially to its front edge. A set of curved baffles 61 as shown in FIG. 4 may be placed under the support surface 17 in order to insure that the airstream will be directed from the back edge 20 to the front edge 18 of the cutting surface not only in the vicinity of the exhaust port 53 but substantially along the entire length of the support surface within the respective cutting stations 13 and 15.

The physical configuration of an exemplary cloth cutting system featuring the present invention is shown in FIG. 1. For sake of clarity the portion of the support surface 17 which normally extends between the two cutting station 13 and 15 has been removed. Between the cutting stations 13 and 15 a short length of transversely extending duct 55 connects the exhaust ports 53, 53a of the stations 13 and 15 with a common riser duct 57 at the top of which an exhaust fan 59 is located. The exhaust ports 53, 53a are located in the end walls 51 of the housings 27 of the respective cutting stations 13 and 15, this being best seen in FIG. 1 for the cutting station 15, and in FIG. 4 for the station 13.

In operation, when the exhaust fan 59 is turned on, air is pulled into the system through the inlets 29a in both stations 13 and 15 and within each station the air is circulated as shown in the figures, going over the support surface 17, down around its rear edge 20 and back under the support surface toward its front edge 18, curving toward the exhaust ports 53, 53a through which it enters the transverse and rising ducts 55 and 57.

In addition to creating the desired air pressure differential, the technique implemented by the illustrated system also serves continuously and rapidly to remove the undesired products of the cutting process such as smoke and cloth particles, thereby preventing damage to the laser beam projection components of the system.

Materials of different weight and thickness may require varying amounts of air pressure differential to hold them securely on the support surface 17. To permit various types of materials to be accommodated, means are provided to vary the air pressure differential produced by a given setting of the exhaust fan 59 so that the air pressure differential may be changed without necessitating a change in the volume of air being moved through the system. This is simply achieved by providing an additional air inlet 63 in the intermediate air path portion 43, shown in FIGS. 1 and 3 as being in the form of a hinged door 65 extending along the bottom of the rear panel 31. By admitting additional air through the inlet 63 into the terminal airpath portion 41, the air pressure existing there will be slightly raised and hence the differential between the pressures existing above and below the support surface 17 will be slightly diminished. Thus, the more widely the door 65 is open the less force will be exerted upon a given material resting on the surface 17.

What is claimed is:

1. A method of holding a layer of material securely upon an air-permeable support surface comprising directing air initially to flow over the said layer of material and transversely across said support surface and further directing said air to flow under said support surface, thereby producing a net air pressure forcing said material against the top of said support surface.

2. A method of holding a layer of material, which is to be cut by burning, securely upon an air-permeable support surface, while simultaneously removing the resulting smoke, comprising the steps of directing air to flow initially over said material transversely across said support surface, further directing said air to flow under said support surface, and removing said air from under said support surface, thereby creating a net air pressure pressing said material against the top of said support surface, and an airflow pattern removing smoke both from above and below said material.

3. The method of claim 2 characterized further by the step of admitting a variable amount of air to flow under said support surface in addition to the air which had initially been directed to flow over said material and across said support surface, thereby varying the amount of net air pressure exerted upon said material.

* * * * *

PO-1050
(5/69)

UNITED STATES PATENT OFFICE
CERTIFICATE OF CORRECTION

Patent No. 3,808,672      Dated May 7, 1974

Inventor(s) Rodolfo Castro, Esteban J. Toscano, Felix J. Viosca

It is certified that error appears in the above-identified patent and that said Letters Patent are hereby corrected as shown below:

FELIX J. VIOSCA, 7909 Topanga Canyon Blvd., #228, Canoga Park, Calif. 91304, should be included as a co-inventor.

Signed and Sealed this twenty-fifth Day of May 1976

[SEAL]

Attest:

RUTH C. MASON
Attesting Officer

C. MARSHALL DANN
Commissioner of Patents and Trademarks